(12) United States Patent
Atkins (10) Patent No.: US 10,949,847 B2
(45) Date of Patent: Mar. 16, 2021

(54) TRANSACTION CONTROL

(71) Applicant: MASTERCARD INTERNATIONAL INCORPORATED, Purchase, NY (US)

(72) Inventor: Michael Clay Atkins, Columbia, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 124 days.

(21) Appl. No.: 16/277,140

(22) Filed: Feb. 15, 2019

(65) Prior Publication Data

US 2019/0188718 A1 Jun. 20, 2019

Related U.S. Application Data

(63) Continuation of application No. 15/274,482, filed on Sep. 23, 2016, now Pat. No. 10,242,361.

(30) Foreign Application Priority Data

Sep. 23, 2015 (EP) .................................... 15186569

(51) Int. Cl.
*G06Q 40/00* (2012.01)
*G06Q 20/40* (2012.01)
(Continued)

(52) U.S. Cl.
CPC ..... *G06Q 20/4014* (2013.01); *G06Q 20/3278* (2013.01); *G06Q 20/352* (2013.01); *G06Q 20/4016* (2013.01); *G06Q 30/06* (2013.01)

(58) Field of Classification Search
CPC ........... G06Q 20/4014; G06Q 20/3278; G06Q 20/352; G06Q 20/4016; G06Q 30/06
See application file for complete search history.

(56) References Cited

U.S. PATENT DOCUMENTS 7,359,880 B2 4/2008 Abel et al.
7,783,564 B2 8/2010 Mullen et al.
(Continued)

FOREIGN PATENT DOCUMENTS

JP H1021100 A 1/1998
JP 2012150563 A 8/2012
(Continued)

OTHER PUBLICATIONS

Anonymous, "Direct Dial from Bank Account Online Payment System," IP.com Prior Art Database Technical Disclosure, dated Jul. 6, 2011. (Year: 2011).*

(Continued)

*Primary Examiner* — Alexander G Kalinowski
*Assistant Examiner* — William B. Bunker
(74) *Attorney, Agent, or Firm* — Buchanan Ingersoll & Rooney PC (57) ABSTRACT

A method of choosing and authorising a transaction with a payment device used by a purchaser under the authority of an owner is described. An analytics engine receives an identifier for a good or service from the purchaser and uses the identifier to identify providers of the good or service and providing a set of provider recommendations for the good or service to the owner. An issuer server receives from the owner approval for one of the set of provider recommendations and determining purchase parameters for that provider recommendation and determines whether the purchase parameters for the transaction match the purchase parameters for the provider recommendation; whereby the transaction is not authorised if the purchase parameters do not match and will not be rejected by the payment control system if the parameters do match.

11 Claims, 8 Drawing Sheets

(51) Int. Cl.
*G06Q 20/34* (2012.01)
*G06Q 20/32* (2012.01)
*G06Q 30/06* (2012.01)

(56) References Cited

U.S. PATENT DOCUMENTS

| | | | | |
|---|---|---|---|---|
| 2002/0026369 | A1* | 2/2002 | Miller | G06Q 30/0241 |
| | | | | 705/14.27 |
| 2002/0174030 | A1* | 11/2002 | Praisner | G06Q 20/10 |
| | | | | 705/39 |
| 2005/0273431 | A1* | 12/2005 | Abel | G06Q 20/102 |
| | | | | 705/42 |
| 2006/0157553 | A1* | 7/2006 | Kelley | G06Q 20/3555 |
| | | | | 235/380 |
| 2007/0205270 | A1* | 9/2007 | Kemper | G06Q 20/382 |
| | | | | 235/380 |
| 2008/0140577 | A1* | 6/2008 | Rahman | G06Q 20/3829 |
| | | | | 705/71 |
| 2009/0157454 | A1* | 6/2009 | Carter | G06Q 20/42 |
| | | | | 705/7.27 |
| 2010/0010901 | A1* | 1/2010 | Marshall | G06Q 20/20 |
| | | | | 705/17 |
| 2010/0325047 | A1 | 12/2010 | Carlson et al. | |
| 2011/0184837 | A1* | 7/2011 | Biro | G06Q 30/0603 |
| | | | | 705/27.1 |
| 2012/0123904 | A1 | 5/2012 | Foerster | |
| 2012/0131094 | A1 | 5/2012 | Lyons et al. | |
| 2012/0265636 | A1* | 10/2012 | Moeggenberg | G06Q 30/02 |
| | | | | 705/26.7 |
| 2013/0024364 | A1* | 1/2013 | Shrivastava | G06Q 20/405 |
| | | | | 705/39 |
| 2013/0204789 | A1* | 8/2013 | Agarwal | G06Q 20/40 |
| | | | | 705/44 |
| 2014/0244503 | A1* | 8/2014 | Sadlier | G06Q 20/4016 |
| | | | | 705/44 |
| 2014/0337175 | A1* | 11/2014 | Katzin | G06Q 20/367 |
| | | | | 705/26.62 |
| 2015/0039493 | A1 | 2/2015 | Crum et al. | |
| 2015/0220914 | A1* | 8/2015 | Purves | G06Q 30/0633 |
| | | | | 705/26.8 |
| 2015/0248664 | A1* | 9/2015 | Makhdumi | G06Q 20/20 |
| | | | | 235/380 |
| 2016/0035036 | A1* | 2/2016 | Eramian | G06Q 30/0631 |
| | | | | 705/26.1 |
| 2016/0117650 | A1* | 4/2016 | Weidenmiller | G06Q 20/26 |
| | | | | 705/44 |
| 2016/0180344 | A1* | 6/2016 | Studnicka | G06Q 20/425 |
| | | | | 705/44 |
| 2016/0343059 | A1 | 11/2016 | Yoshii | |
| 2018/0046623 | A1* | 2/2018 | Faith | G06Q 30/06 |

FOREIGN PATENT DOCUMENTS

| | | | |
|---|---|---|---|
| JP | 2014174781 A | 9/2014 | |
| WO | WO-0028461 A1 * | 5/2000 | G06Q 40/04 |
| WO | WO-2005074366 A2 * | 8/2005 | G06Q 20/12 |
| WO | WO-2013034192 A1 * | 3/2013 | G06Q 20/4012 |
| WO | WO-2013165913 A1 * | 11/2013 | G06Q 20/351 |
| WO | 2015/115423 A1 | 8/2015 | |

OTHER PUBLICATIONS

Amy Hoke, "Commercial Card Controls: Finding a Balance Between Control and Usability at the Point of Sale," Research Note, Mercatur Advisory Group, www.mercaturadvisorygroup.com (Year: 2014).*
Anonymous, "Direct Debit from Bank Account Online Payment System", IP.conn Prior Art Database Technical Disclosure, Jul. 6, 2011.
Summons to Attend Oral Proceedings dated Dec. 6, 2018 issued by the European Patent Office in corresponding European Patent Application No. 15 186 569.8 (7 Pages).
Extended European Search Report dated Dec. 16, 2015 issued by the European Patent Office in corresponding European Patent Application No. 15 186 569.8 (8 Pages).
European Communication dated Nov. 2, 2017 issued by the European Patent Office in the corresponding European Patent Application No. 15 186 569.8 (6 Pages).
Decision to Refuse dated Aug. 6, 2019 issued by the European Patent Office in corresponding European Patent Application No. 15 186 569.8 (7 pages).

* cited by examiner

TRANSACTION CONTROL

FIELD

This invention relates generally to transaction control, and in particular embodiments relates to a method and system for an owner to control transactions to be made by a purchaser with a payment device associated with the owner's account.

BACKGROUND OF INVENTION

Payment cards such as credit cards and debit cards are very widely used for all forms of financial transaction. The use of payment cards has evolved significantly with technological developments over recent years. Many payments are made at retail locations, typically with a physical payment card interacting with a point of sale (POS) terminal to support a transaction authorization. These payment cards may interact with a POS by swiping through a magnetic stripe reader, or for a "chip card" or "smart card" by direct contact with a smart card reader (under standard ISO/IEC 7816) or by contactless interaction through local short range wireless communication (under standard ISO/IEC 14443).

Greater understanding and better measurement of user behaviour has allowed for more sophisticated fraud detection in payment device transactions. A further development has been for users to determine their own allowed or predicted behaviour, thus setting boundaries on the use of group cards or a single card guaranteed by a party other than the user, and allowing for stronger fraud detection when activity has been outside a user-set boundary. This can be achieved, for example, with the proprietor's "In Control" solution—a card issuer provides a web site or mobile app using "In Control" that enables a user to set a variety of different limits and permissions for cards under that user's control.

This approach is very useful to allow effective use of group cards or cards for which an owner has delegated limited authority to a purchaser—the owner can set purchase limits or other constraints on behaviour, and a transaction will only be authorised by an issuer if these limits or constraints are met. There are however many situations in which a more flexible solution would be desirable. The purchaser may operate within the allowed limits but still make purchasing decisions that the owner would not choose to approve, or the purchaser may wish to make purchases that the owner would readily approve but be unable to do so until the owner takes steps to modify existing limits and constraints. It would be desirable to handle delegated purchasing responsibility of this type in a more flexible way.

SUMMARY OF INVENTION

In a first aspect, the invention provides a method of choosing and authorising a transaction with a payment device used by a purchaser under the authority of an owner, the method comprising: an analytics engine receiving an identifier for a good or service from the purchaser; the analytics engine using the identifier to identify providers of the good or service and providing a set of provider recommendations for the good or service to the owner; an issuer server receiving from the owner approval for one of the set of provider recommendations and determining purchase parameters for that provider recommendation; and the issuer server determining whether the purchase parameters for the transaction match the purchase parameters for the provider recommendation; whereby the transaction is not authorised if the purchase parameters do not match and will not be rejected by the payment control system if the parameters do match.

Using this approach, the owner can delegate responsibility effectively to a purchaser while retaining control of the purchase process, ensuring that the most appropriate purchasing decisions are made in the light of any relevant parameter.

In embodiments, the issuer server receives from the owner a notification that funds are allocated for the approved provider recommendation.

In embodiments, the identifier may determine the good or service. However, in some cases, identifier may not determine the good or service, and the analytics engine may then perform a matching step to determine the good or service from the identifier. The analytics engine may then request confirmation from the purchaser that the good or service has been correctly determined in the matching step.

In embodiments, the analytics engine performs an equivalents matching step to identify alternatives to the determined good or service. In embodiments, the set of recommendations comprises a purchaser preferred recommendation.

In embodiments, the provider recommendations from the set each comprise one or more of price, distance to purchase, availability and merchant identification.

In a second aspect, the invention provides a service infrastructure comprising one or more computing systems, the computing systems each comprising at least one processor and at least one memory, wherein suitably programmed processors of the service infrastructure are adapted to perform the functions of the issuer server and the analytics engine according to a method as described above.

In a third aspect, the invention provides a method for a purchaser using a payment device to recommend and make a purchase under the authority of an owner of the payment device, the method comprising: providing an identifier for a good or service to an analytics engine; receiving advice that the purchase can be performed according to purchase parameters determined by the owner, wherein the purchaser parameters are determined from provider recommendations provided by the analytics engine to the owner on the basis of the identifier; and making the purchase using the payment device in accordance with the purchase parameters.

In embodiments, the identifier determines the good or service. However, in some cases the identifier may not determine the good or service, in which case the purchaser may provide the identifier for the analytics engine to perform a matching step to determine the good or service from the identifier. The purchaser may then receive from the analytics engine a request for confirmation that the good or service has been correctly determined in the matching step.

The purchaser may provide directly or inferentially a purchaser preferred recommendation. The purchaser may receive an invitation to negotiate with the owner before the owner selects a provider recommendation, from a set of provider recommendations, from which the purchase parameters are determined. This set of provider recommendations may be provided to the purchaser in association with the invitation to negotiate.

In a fourth aspect, the invention provides a payment management device comprising a processor and a memory, wherein the processor is programmed to perform the method of the third aspect of the invention to recommend and make a purchase under the authority of an owner of the payment device.

In a fifth aspect, the invention describes a method for an owner of a payment device to determine and authorise a transaction to be made by a purchaser using the payment device, the method comprising: receiving from an analytics engine a set of provider recommendations for the purchase determined from an identifier for a good or service from the purchaser; approving the transaction for one of the set of provider recommendations; whereby the transaction will be authorised when initiated for the approved provider recommendation.

On approving a provider recommendation, the owner may allocate funds to be used by the payment device for the approved provider recommendation. The set of recommendations may comprise a purchaser preferred recommendation. The provider recommendations from the set may each comprise one or more of price, distance to purchase, availability and merchant identification.

In embodiments, the owner issues to the purchaser an invitation to negotiate before the owner selects a provider recommendation, from a set of provider recommendations, from which the purchase parameters are determined. This set of provider recommendations may be issued to the purchaser in association with the invitation to negotiate.

In a sixth aspect, the invention provides a payment management device comprising a processor and a memory, wherein the processor is programmed to perform the method of the fifth aspect of the invention to determine and authorise a transaction to be made by a purchaser using the payment device.

In a seventh aspect, the invention provides a method of authorising a transaction at a payment control system with a payment device used by a purchaser under the authority of an owner, the method comprising after selection of a provider recommendation for the purchase from a set of provider recommendations determined by an analytics engine from an identifier provided by the purchaser: determining purchase parameters for the provider recommendation; receiving a request to authorise a transaction for the payment device, and determining whether the purchase parameters for the transaction match the purchase parameters for the provider recommendation; whereby the transaction is not authorised if the purchase parameters do not match and will not be rejected by the payment control system if the parameters do match.

In embodiments, the payment control system from the owner a notification that funds are allocated for the approved provider recommendation.

There is also provided a payment control system adapted to perform the method of the seventh aspect of the invention.

In an eighth aspect, there is provided a method for an analytics engine to provide purchase recommendations to an owner of a purchasing device for a purchase to be made by a purchaser using the payment device, the method comprising: receiving an identifier for a good or service from the purchaser; and using the identifier to identify providers of the good or service and providing a set of provider recommendations for the good or service to the owner for approval.

In embodiments, the identifier determines the good or service. In some cases, the identifier may not determine the good or service, in which case the analytics engine performs a matching step to determine the good or service from the identifier. The analytics engine may then request confirmation from the purchaser that the good or service has been correctly determined in the matching step.

In embodiments, the analytics engine performs an equivalents matching step to identify alternatives to the determined good or service. In embodiments, the set of recommendations comprises a purchaser preferred recommendation. In embodiments, the provider recommendations from the set each comprise one or more of price, distance to purchase, availability and merchant identification.

In some cases, the recommendations may comprise an online purchase recommendation. In such a case, on approval of the online purchase recommendation the online purchase may be made on behalf of the purchaser.

In a ninth aspect, the invention may provide an analytics engine comprising at least one processor and at least one memory, wherein a suitably programmed processor of the analytics engine is adapted to perform the method of the eighth aspect of the invention.

BRIEF DESCRIPTION OF FIGURES

Embodiments of the invention will now be described, by way of example, with reference to the accompanying Figures, of which.

DESCRIPTION OF SPECIFIC EMBODIMENTS

Specific embodiments of the invention will be described below with reference to the Figures.

Figure 1:
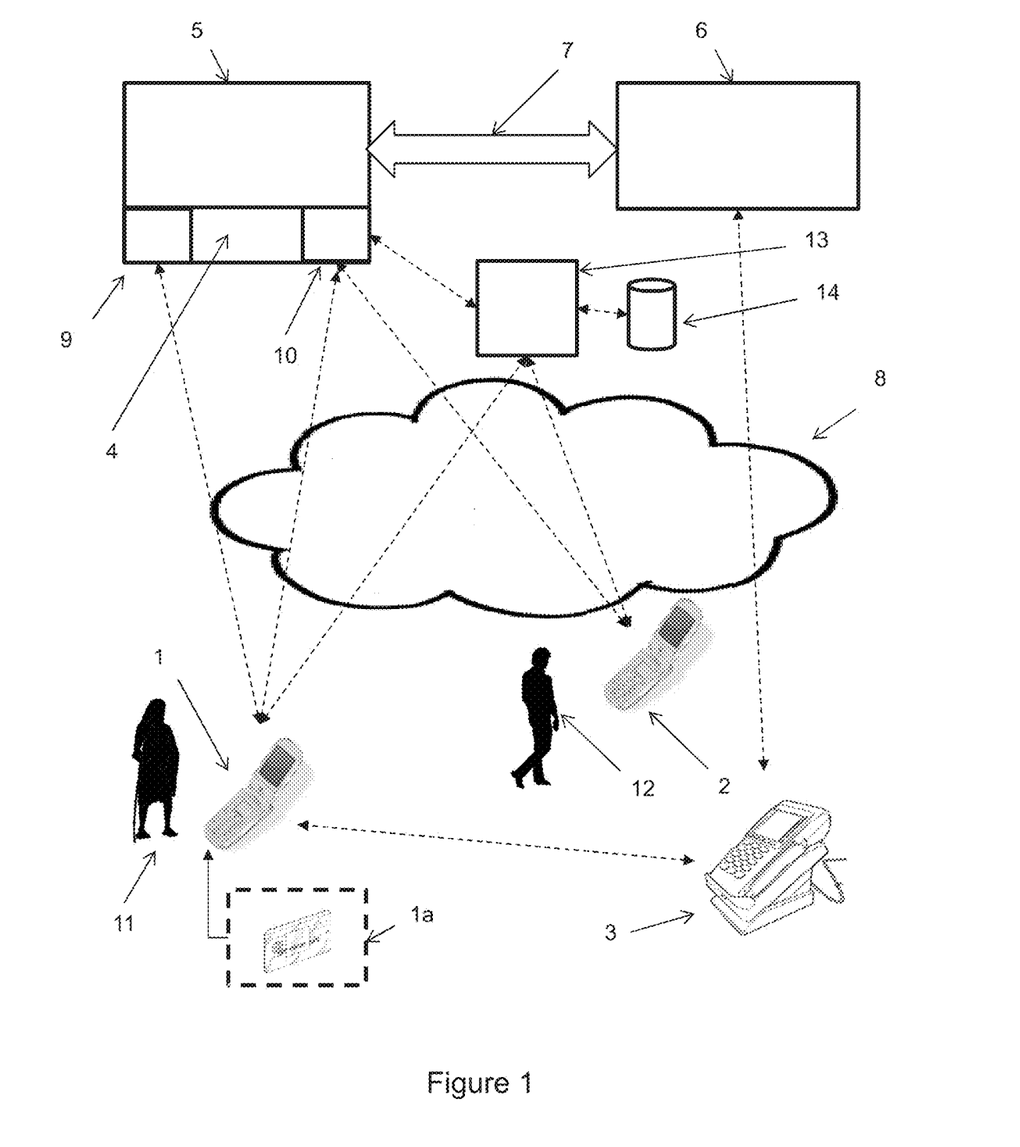
FIG. 1 shows an exemplary transaction system in which embodiments of the invention may be used.

FIG. 1 shows an exemplary transaction system in which embodiments of the invention may be used.

A purchaser 11 is provided with a payment device—this may be for example a payment card 1a. As will be discussed later, in embodiments of the invention the payment device may be any element that can be used to allow the purchaser to access a transaction infrastructure to make a payment.

The purchaser is also provided with a payment management device to allow interactions with the transaction infrastructure and the account owner 12, who also has an account management device 2. Here each management device is a cellular wireless telecommunications terminal 1 (but it may be any other mobile computing device—in embodiments, this need not even be mobile apparatus and may be a desktop computer). In embodiments the payment management device 1 may also be the payment device—it may act as a proxy for a payment card 1a when the payment management device 1 includes payment capabilities, such as are found on mobile phones with NFC contactless functionality.

Such management devices and payment devices typically have processors and memories for storing information including firmware and applications run by the respective processors. Payment devices will typically be equipped with means to communicate with other elements of a payment infrastructure. These communication means may comprise antennae and associated hardware and software to enable communication by means of the ISO/IEC7816 chip interface or may comprise contactless card protocols such as those defined under ISO/IEC 14443 and EMVCo Book D, or they may comprise an antenna and associated hardware and software to allow local wireless networking using 802.11 protocols or any combination of the above.

Other computer equipment in a conventional infrastructure is typically fixed, but in cases of interest point of interaction (POI) terminals 3 may also be portable. The example shown is a mobile point-of-sale (MPOS) terminal used by a merchant interacting with the user. Such equipment is typically connected or connectable to an acquiring bank 6 or other system in a secure way (either through a dedicated channel or through a secure communication mechanism over a public or insecure channel—here connection is shown as passing through the public internet 8). There is also shown a mechanism to allow connection between the payment management device 1 and a card issuing bank 5 or system associated with the user. A banking infrastructure 7 will also connect the card issuer 5 and the acquiring bank 6, allowing transactions to be carried out between them.

An issuing bank application server 4 is shown explicitly as part of the issuing bank 5. While indicated here as a single computing system (comprising processor, memory, communications and any other relevant element of such a system), the issuing bank application server 4 may be provided as elements of a common computing system with other elements of the issuing bank, may be comprised physically or logically separated elements, or may even be implemented wholly or partly as services provide by a trusted third party provider (such as the provider of the banking infrastructure). Two functional elements provided by the issuing bank 5 through the issuing bank application server 3 are shown in more detail. These are an issuer authentication module 9 and an issuer customer server 10. The issuer authentication module 9 is shown as connecting directly to the payment management device 1 (as may be the case in some use contexts), though in many cases the issuer authentication module will be accessed through the banking infrastructure 7 to authenticate a user to validate a transaction. The issuer customer server 10 is also shown as connecting to the account management device 2 and the payment management device 1, though a user may connect to the issuer customer server 10 using any suitable computing device. In embodiments, the account owner 12 uses the issuer customer server 10 to set permissions relating to use of a user account and these may optionally be viewed by the purchaser 11.

Also shown is an analytics server 13 with an associated market database 14. While these are shown in FIG. 1 as generally associated with the banking infrastructure, this is not necessarily the case and one or both of the analytics server 13 and associated market database 14 may be provided by other parties. As will be discussed below, the analytics server 13 receives identifiers for prospective purchases from the payment management device 1, determines appropriate vendors with the assistance of the market database 14, and provides recommendations for the account owner 12 either directly to the account management device 2 or through the issuer customer server 10.

Figure 2A:
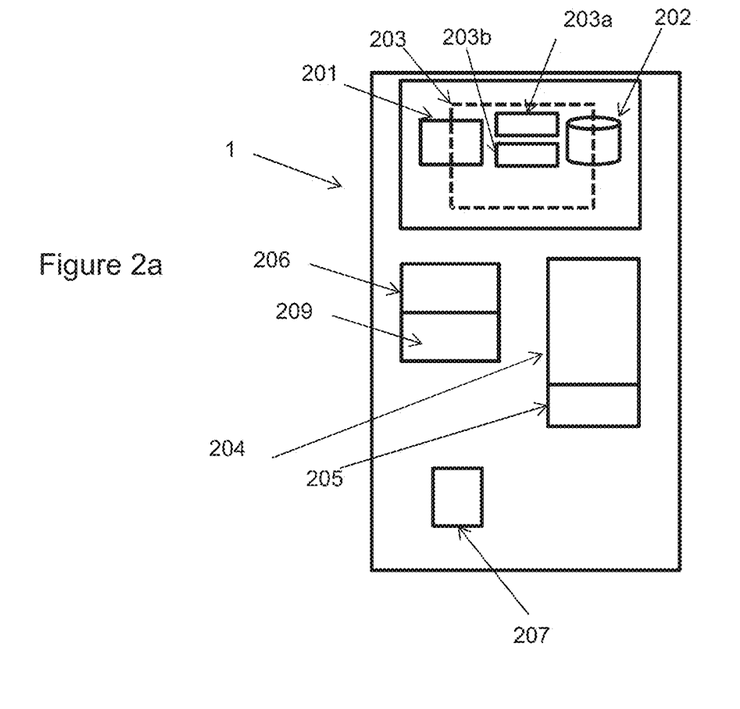
FIGS. 2a, 2b and 2c show respectively elements of a mobile computing device, an analytics server and an issuing bank application server for use in embodiments of the invention.
Figure 2B:
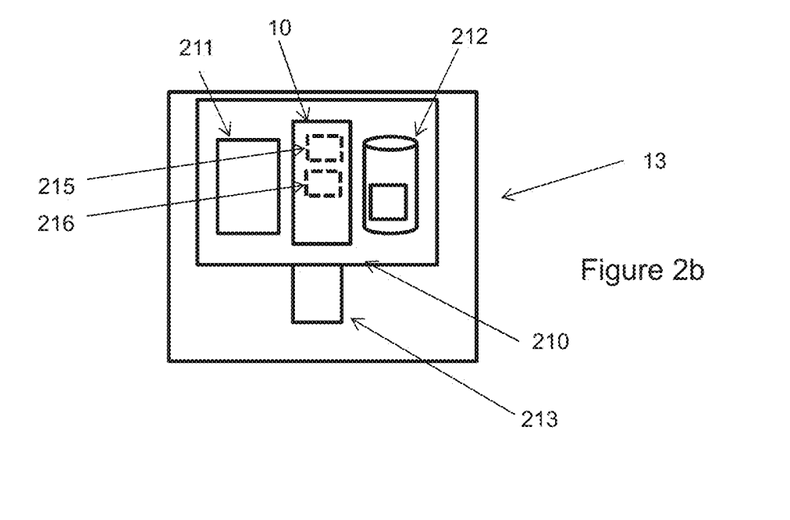
Figure 2C:
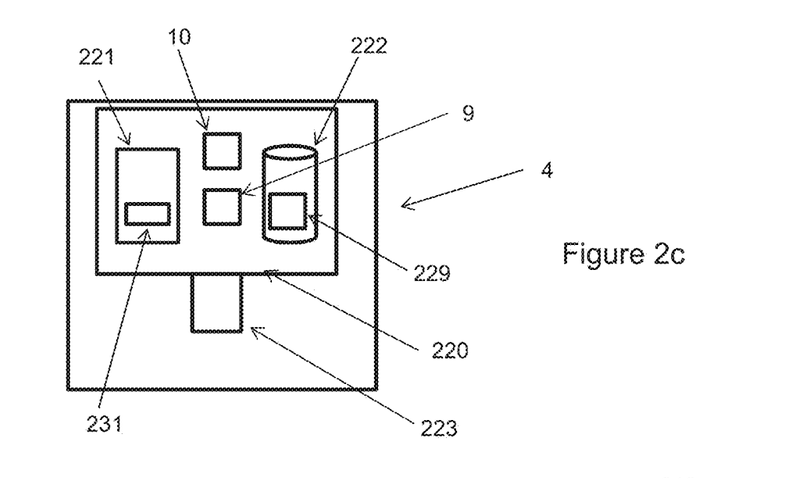

FIGS. 2a, 2b and 2c respectively illustrate schematically relevant functions of a a mobile computing device, an analytics server and an issuing bank application server for use in embodiments of the invention.

FIG. 2a shows a payment management device 1—this may be a mobile handset though it should be noted that any other portable computing apparatus such as a laptop, notebook or tablet computer can be used as computing apparatus in embodiments of the invention (for some uses, this computing apparatus need not be portable). As will be discussed below, the account management device 2 has similar functionality, though differences will be discussed below. The payment management device comprises a processor 201 and a memory 202, such that the memory stores and the processor will subsequently run applications (shown generally as residing in an application space 203) such as a payment management application 203a and a transaction approval application 203b. The payment management device has a user interface comprising a display 204 and a touchscreen 205 (or other input device) and associated drivers to allow a user to enter data into and view information from the applications 203. The payment management device 1 also has a communications capability, such as a subscriber information module 206 and wireless communication element 207 together providing the ability to connect to a cellular communications network, in addition or alternatively the payment management device 1 may include wifi or wired network access. The payment management device may need to perform cryptographic operations in order to interact securely with bank application server 4—this may use a secure processing capability 209 within the subscriber information module 206 or be managed in software using technologies such as Host Card Emulation.

The account management device 2 is not shown separately as it has essentially the same elements as the payment management device 1—the primary difference is that the payment management application 203a and the transaction approval application 203b have different functionality for the account owner than for the purchaser, as will be described below. There is also no particular requirement for the account owner computing apparatus to be mobile.

FIG. 2b describes elements of the analytics server 13. This is shown as comprising a processing environment 210 with processor 211 and memory 212, with associated communications functionality 213. The communications functionality includes networking capability allowing communication with the issuing bank applications server 3 and there will be a telecommunications or other networking capability allowing communication over a public network with the payment management device 1 and the account management device 2. The processor 211 is a representation of processing capability and may in practice be provided by several processors. The market database 14 is shown as a discrete element in FIG. 1, but may also be incorporated within the memories 212 of the analytics server. The analytics engine 214 is shown as an element within the processing environment 220—it is shown here as having a matching subsystem 215 and an offering and recommendations subsystem 216.

FIG. 2c describes elements of the issuing bank application server 3. This is shown as comprising a processing environment 220 with processor 221 and memory 222, with associated communications functionality 223. The communications functionality may include networking capability allowing communication with the payment network infrastructure 7, there will be a telecommunications capability allowing communication over a public network with the payment management device 1 that will be secured. The processor 221 is a representation of processing capability and may in practice be provided by several processors. Other features, such as a user database, are not shown explicitly here as they may be implemented by conventional means and do not need to be discussed further to explain the elements of the present disclosure. The issuer authentication module 9 is shown as an element within the processing environment 220, with associated user authentication data 229 stored in the memory 222. The issuer customer server 10 is also shown as an element within the processing environment 220. Elements shown within the processing environment 220 use the processor 221 and the memory 222 to deliver functionality—in the case of the issuer authentication module 9, this is for the issuer 5 to provide confirmation to the banking infrastructure 7 and ultimately the acquiring bank 6 that a legitimate cardholder is involved in a transaction, whereas in the case of the issuer customer server, this is for the cardholding customer of the issuing bank 5. In embodiments, a cryptographic processor 231 may be used to enable secure communication between the issuing bank application server 4 and the payment management device 1 or the account management device 2.

Figure 3:
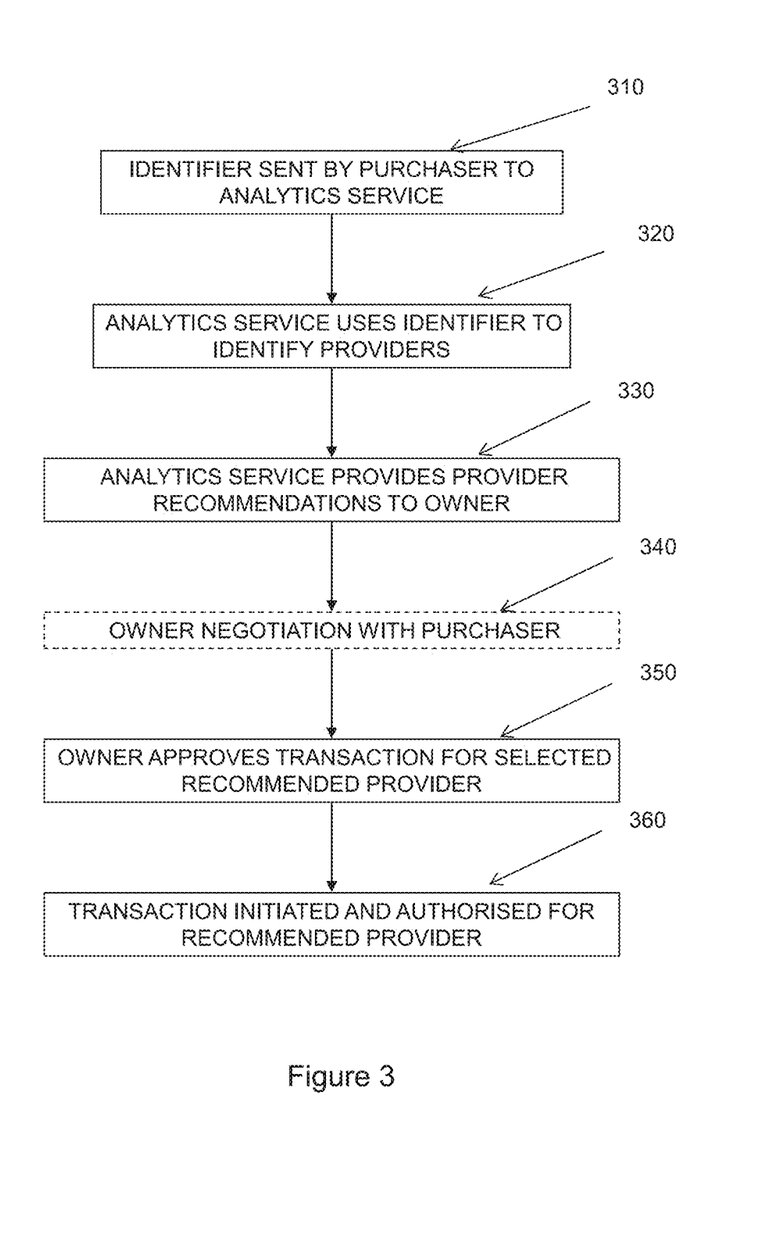
FIG. 3 illustrates elements of a method of choosing and authorising a transaction according to a broad aspect of the invention.

FIG. 3 shows in general terms a method of choosing and authorising a transaction with a payment device. The payment device is used by a purchaser, but the authority of the owner is required for the payment to be made. The purchaser determines a good or service that he or she wishes to purchase, and sends 310 an identifier for that good or service to an analytics service. The analytics service then uses 320 the identifier to identify the good or service and appropriate providers for the good or service. The analytics service then provides 330 recommendations to the owner of the account associated with the payment device. After this, there may be a negotiation 340 between the owner and the purchaser to achieve a result that is satisfactory to both. In any event, the owner approves 350 a transaction for the good or service with a selected recommended provider. The transaction is then authorised 360 for the recommended provider—it may then be initiated directly, or after further action by the purchaser.

A specific embodiment of a method of choosing and authorising a transaction will now be described with reference to FIG. 4. In this embodiment, the purchaser 11 uses a mobile phone 1 which acts as both a payment device and a payment management device. Use of the payment device is constrained by the account owner 12, typically by a solution such as In Control by which the issuer will only approve transactions that fall within constraints established by the account owner 12. In some embodiments, all transactions may require some form of pre-approval by the account owner—for example, there may be a zero spending balance for the account associated with the payment device until funds are passed to the account for an account owner authorised transaction. This approach is described further below.

The purchaser 11 wishes to make a purchase, and so identifies the goods or services that he or she wishes to purchase through the transaction approval application 203*b*. As shown in FIG. 4, this may be done by taking a photograph 41 of the product desired for purchase. Many other approaches are possible to establishing an identifier for the desired product or service—the purchaser could scan a product barcode, could enter a catalogue identifier, or could identify a URL relating to the product. The transaction approval application 203*b* may collect additional information at this time—in particular, it may be desirable to capture purchaser location information if the purchase is to be (or could be) made from a physical location. This could be the purchaser's actual location at the time of compilation of the transaction approval request, or a preferred purchase location (for example, a transaction approval request could be made from an office location for purchase at or near a work site). Other information that could be included includes purchaser merchant preferences, indication of whether alternative products or services could be acceptable, and urgency of purchase (as online purchase options may be acceptable if the product or service was needed within a few days, but not if it was needed within the next hour). The identifier and any additional information are compiled into a transaction approval request by the transaction approval application 203*b* and sent to the analytics server 13 (a notification could also be made at this time to the account owner if desired to indicate that a transaction approval request was to be expected).

When the transaction approval request is received by the analytics server 13, it is logged and the identifier is used by the matching subsystem 215 (shown in FIG. 2*b*) to determine matching products and services. The matching subsystem 215 has a variety of data sources available, as shown in FIG. 4—these include the public Internet 42 and third party market data 43 which can both be used to identify products and services associated with the identifier, either directly or as alternatives. The matching system also has access to proprietary data 44 that may indicate preferences of the purchaser and the account owner.

Figure 5:
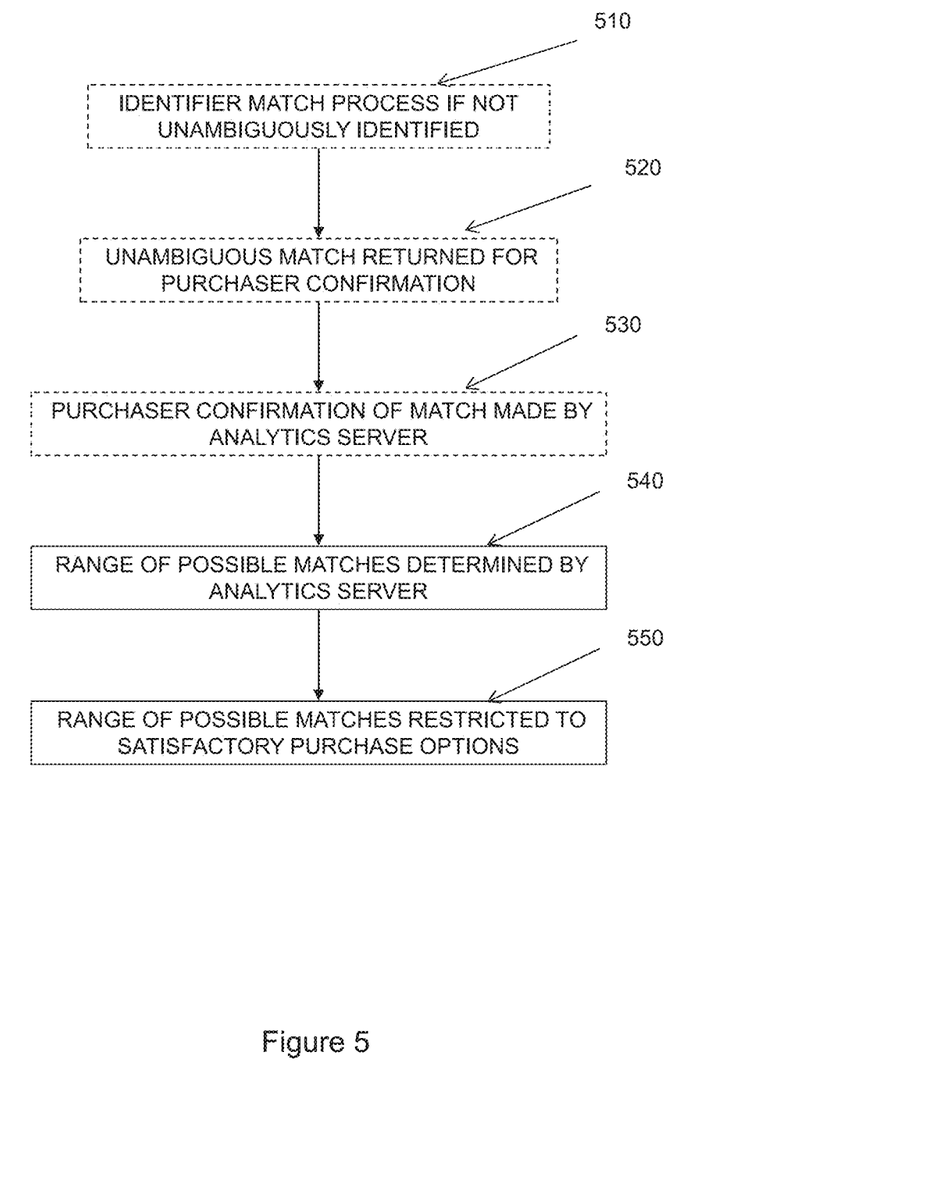
FIG. 5 shows a matching system used by the analytics server of FIG. 2b in an embodiment of the invention.

Operation of the matching system 215 is shown in FIG. 5. The identifier may unambiguously indicate a good or service, but if it does not, then there may need to be an identifier match process 510—for example, if the purchaser 11 sends an image as part of the transaction approval request, Google image search may be used to identify the product or service and match it against an unambiguous product or service identification. Optionally, this unambiguous product or service identification could be sent back 520 to the purchaser 11 for confirmation (either singly, or as part of a group of possibilities from which the purchaser 11 should select). After confirmation is received 530 if required, an unambiguous identification has been made in either version of the process, and the next stage is to determine 540 a range of possible matches. This may include product or service alternatives unless these have been specifically excluded by the purchaser (in some arrangements, such alternatives may be included even if they have been excluded by the purchaser to enable a negotiation between the purchaser 11 and the account owner 12 on this point if there is a lower priced alternative available).

This range of possible matches may be restricted 550 before offerings are considered—this restriction could be a part of either the matching subsystem 215 or the offering subsystem 216 or both—in this case a restriction process is shown in each subsystem. Here, matching subsystem 215 only fields out certain alternatives that are unlikely ever to be satisfactory purchase options—for example, that are determined only to be available in other countries, or that are only associated with sources specifically disapproved by the account here.

Figure 6:
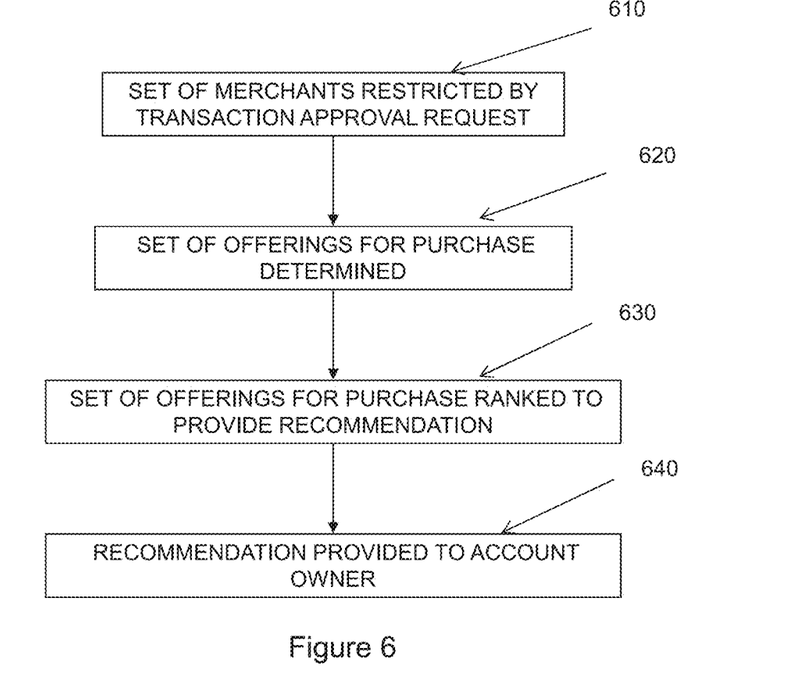
FIG. 6 shows an offering system used by the analytics server of FIG. 2b in an embodiment of the invention.

The alternatives identified by the matching subsystem 215 are then provided to the offering and recommendations subsystem 216 (shortened to offering subsystem 216 below) to determine possible merchants for the purchase. The operation of the offering subsystem 216 is shown in FIG. 6. Additional information used in the transaction approval request may now be used to restrict 610 the merchants that can be considered for the purchase. For example, if the urgency of delivery is such that online retailers cannot be used, these may be excluded (or in some cases included, but flagged, so that they may feature in a subsequent purchaser and account owner negotiation). Geographical information may be used to restrict out merchants with a store more than a particular distance from the indicated purchaser location—merchant location may also be given a weighting in subsequent prioritisation of offerings.

The offering subsystem 216 then determines 620 a set of offerings for the purchase. The offering subsystem searches through merchants that have not been restricted out by either the matching subsystem 215 or the offering subsystem, and determines price and availability for the product or service (or acceptable match) at a location or with delivery within acceptable parameters.

The offering subsystem then ranks 630 the offerings in the set. This ranking may be determined primarily by price, but be modified by other modifiers such as location (a positive weighting may be given to favourable location—this may be a strongly positive weighting if the purchaser is identified as being in a particular store location and ready to make an immediate purchase—and a negative weighting given to uncertain availability or delivery delay). It should be noted that the ranked set may include offerings that fall outside criteria set by the purchaser (though this is likely to result in a negative weighting if such offerings are included) as the account owner may still consider these to provide an acceptable alternative. The top ranked offerings are then provided 640 by the offering subsystem 216 as a recommendation list (optionally, this may include a purchaser preferred merchant offering even if this would not otherwise be ranked highly enough to make the recommendation list—the account owner may determine that the practical difference is sufficiently small that the purchaser should simply be allowed to proceed with the purchase that he or she wishes to conduct).

Figure 4:
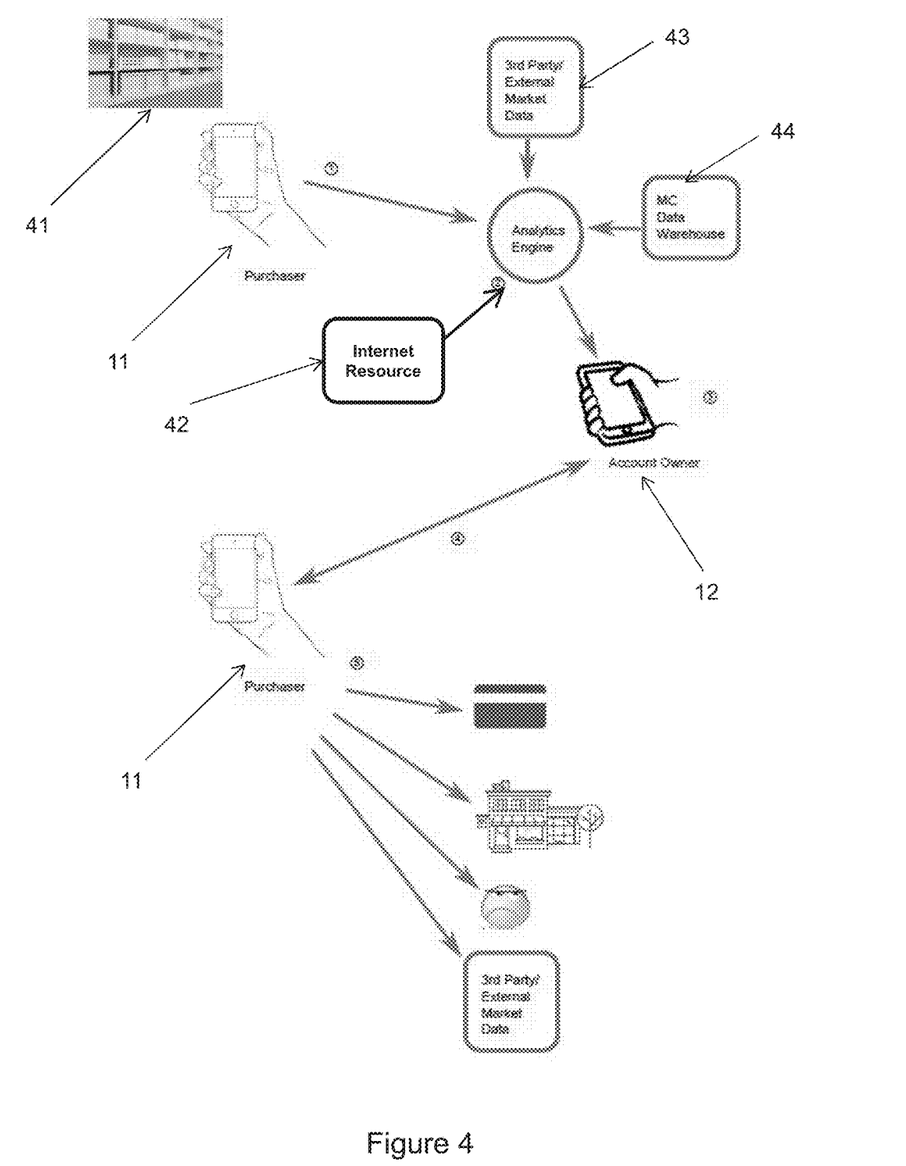
FIG. 4 shows a method of choosing and authorising a transaction according to an embodiment of the invention.
Figure 7:
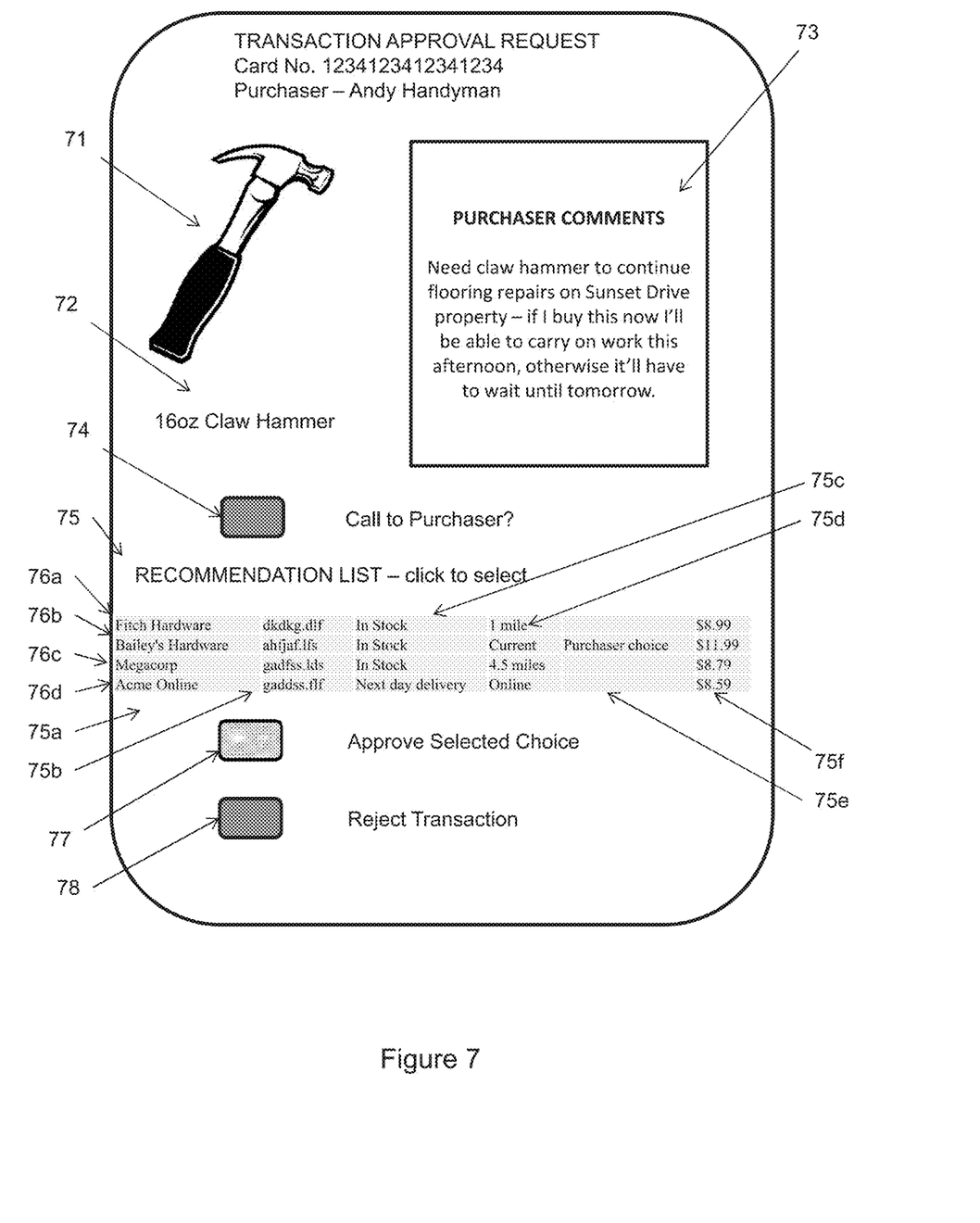
FIG. 7 shows a user interface for the payment management device of an account owner for an embodiment of the invention.

As is shown in FIG. 4, the recommendation list is then sent with a copy (or relevant extracted details therefrom) of the original transaction approval request to the account owner 12. In this case, the account owner also has a mobile phone as payment management device, and receives the recommendation list through his or her copy of the transaction. FIG. 7 shows an exemplary user interface for the account owner's transaction approval application 203b illustrating a transaction approval request recommendation list. An image 71 and description 72 of the product or service to be purchased is provided, along with purchaser comments 73 to explain any relevant circumstances that may affect the transaction approval decision. A call to purchaser button 74 is provided to initiate a discussion between the purchaser and the account owner—pressing this button may initiate a call to the purchaser, or send a text asking for the purchaser to call the account owner, or may allow the account owner to leave a message. These options are probably not required if the account owner is going to take a purchaser preferred option, but may be desirable if the account owner wishes to approve an option from the recommendation list which does not appear to be that favoured by the purchaser. One possibility here is for the account owner to select a preferred option and then hit the call to purchaser button 74—this could then send details of the account owners preferred choice to the purchaser before initiating the call, thus focussing any subsequent discussion or allowing the purchaser to confirm directly by text or message that the alternative option is acceptable (if it is), obviating the need for discussion. Alternatively, the whole recommendation list may be provided or made available to the purchaser for review.

The account owner is invited to choose an option from the recommendation list 75. Entries in the recommendation list here comprise a merchant name 75a, an identifier 75b providing further information about the specific offering provided by the merchant, an availability indication 75c, a geographic proximity indication 75d, purchaser preference or any other relevant qualification 75e and price 75f. The recommendation list here includes an online option as well as physical stores—in the case of the online option a delivery time is given instead of an "In Stock" notification.

The identifier may be used to allow the account owner and the purchaser to assess the selected option, and in some cases even to initiate an order. For example, for a bricks and mortar store, the identifier may provide an entry from a merchant's product catalogue, but may also include availability information for a specific store, but may even be usable (for example in combination with a purchaser's mobile payment application) to provide a completed order to prepay for the item so that it only needs to be collected by the purchaser. Similarly, for an online order the identifier may provide or may be used to configure an online order for the product or service ready for sending.

The recommendation list 75 here is weighted, and is not determined solely by price—the first entry 76a achieves the best weighting although it does not have the lowest price. The price is low but not the lowest, stock is available and the store is close. The purchaser preferred option 76b is ranked lower as it is significantly more expensive. Other options are ranked lower despite having a lower price than the purchaser preferred option because of distance or lack of instant availability. This is of course only one possible recommendation logic—other orderings may result from different logic. The account owner—after a discussion with the purchaser if desired—selects an option and hits the transaction approval button 77 for the accepted choice. A rejection button 78 is provided to reject the transaction altogether.

Figure 8:
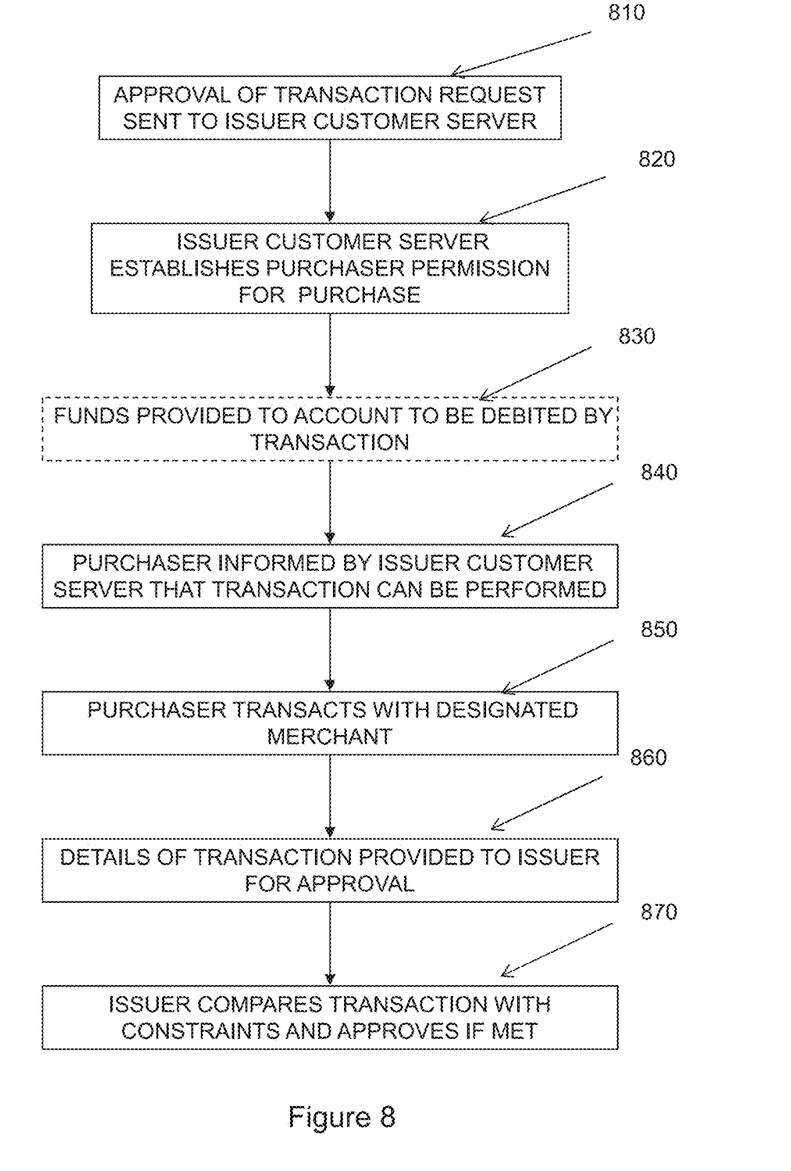
FIG. 8 shows a process flow for a transaction after transaction request approval according to an embodiment of the invention.

An exemplary process flow when a transaction request has been approved by the account owner is shown in FIG. 8. Approval is communicated 810 from the account owner's payment management device to the issuer customer server 10 and optionally to the purchaser's payment management device. The issuer customer server then (using In Control or similar) establishes 820 that the purchaser has permission to use the payment device to make the purchase approved by the account owner, and if necessary funds are provided 830 to the account associated with the payment device to meet the cost of the transaction. The constraints on the purchase—particularly the merchant, but possibly also the transaction amount and a time of purchase—may all be managed by existing In Control functionality. The purchaser is then informed 840 by the issuer customer server 10 that he or she may proceed with the purchase. When the purchaser then transacts 850 with the approved merchant, the details of the transaction are then provided 860 through the transaction system to the issuer for approval in the normal manner. The authentication process may include an authentication of the purchaser as a legitimate user of the transaction card by the issuer authentication module, for example by verification of an online PIN entered by the purchaser. In this embodiment, it also includes ensuring that the transaction constraints associated with the approved transaction are met—as noted, these will include a merchant identification but also generally an amount (though this could be managed by holding a zero balance on the card and only providing necessary funds for a transaction when that transaction has been approved) and may have further limitations such as a permissible range of transaction times. When the transaction is approved 870 by the issuer it completes and clears as a normal transaction.

In some cases, there is no need for the purchaser to take further action when the purchase has been agreed—for example, agreement by the parties to an online order may be sufficient for the order to be made on the purchaser's behalf as a direct outcome of the transaction approval process. It may be already agreed between the parties that if appropriate online fulfillment is possible, then this will be done—in this case there may be no reversion to the purchaser if the purchase is approved but simply an order with appropriate account owner approval—if purchase parameters have been determined in advance, the online order may be made directly. As is shown in FIG. 4, there are many possible outcomes after a transaction approval process of this type: the purchaser may make a purchase from a bricks and mortar retailer or an online one for a physical or digital good and this may or may not be the combination initially envisaged by the purchaser, or the purchase may be rejected altogether.

While specific embodiments described in detail above, the skilled person will appreciate that alternative embodiments may readily be devised that still fall within the scope of the claims. The scope of the invention is defined by the spirit and scope of the claims and is not limited by the embodiments described here.

What is claimed is:

1. A method of choosing and authorizing a transaction with a payment device used by a purchaser under the authority of an owner, wherein the payment device is associated with an account owned by the owner and on which the owner has placed purchase restrictions including provider restrictions and purchase parameters, the method comprising:

extracting, by a remote analytics server, an identifier for a good or service for a prospective purchase from an approval request compiled by and received from a payment management device of the purchaser;

confirming, by the remote analytics server, a match of the good or service with the identifier;

creating, by a subsystem of the remote analytics server, (i) on a basis of the approval request, including the identifier, (ii) using weighted attributes, and (iii) in accordance with recommendation logic executing on a processor of the remote analytics server, a ranked recommendation list including possible providers that offer the good or service, wherein the recommendation list is ranked according to the purchase parameters and the provider restrictions;

automatically transmitting, by the remote analytics server, to an account management device of the owner, the approval request, including the identifier and the ranked recommendation list, wherein the account management device is remote from the payment management device, wherein a transaction approval application installed on said account management device causes the activation of an owner interface comprising at least:

an indication of the approval request;

the ranked recommendation list of possible providers including an indication of the purchaser's provider preference, wherein the interface is configured to receive an owner selection of an individual provider from the ranked recommendation list;

an input control element for initiating communication between the owner and the purchaser; and an input control element for transaction approval or denial, wherein the approval is associated with the owner's provider selection in the interface, and wherein the transaction approval application is configured to cause the account management device to transmit the owner's selected provider from the account management device to an issuer server;

in response to an authorization of the approval request by an issuer server, automatically initiating, using the identifier, the purchase of the good or service at the point of sale device of the approved provider, wherein the authorization is based on purchase parameters for the approved provider.

2. The method of claim 1, wherein the analytics engine performs an equivalents matching step to identify alternatives to the determined good or service.

3. The method of claim 1, wherein the owner issues to the purchaser an invitation to negotiate before the owner selects a provider recommendation, from a set of provider recommendations, from which the purchase parameters are determined.

4. The method of claim 1, wherein the weighted attributes include at least one of price and location.

5. The method of claim 1, further comprising:

transmitting, by the remote analytics server, to the account management device of the owner, along with the approval request, an image and a description of the product or service and purchaser comments.

6. A method for an owner of a payment device to determine and authorize a transaction to be made by a purchaser using the payment device, wherein the payment device is associated with an account owned by the owner and on which the owner has placed purchase restrictions including provider restrictions and purchase parameters, the method comprising:

transmitting, by a transaction approval application of a payment management device of the purchaser, to a remote analytics server, an identifier associated with a good or service, wherein the analytics server confirms an unambiguous match of the good or service with the identifier;

receiving, by a transaction approval application of an account management device of the owner, from an analytics engine of a remote analytics server, a ranked recommendation list including possible providers for a good or service for a prospective purchase by a purchaser, wherein a subsystem of said remote analytics server (i) comprises at least one processor, (ii) creates the ranked recommendation list on a basis of purchase parameters and provider restrictions, weighted attributes and an approval request, including the identifier, and (iii) in accordance with recommendation logic executing on the processor, and wherein the account management device is remote from the payment management device;

receiving, by the account management device of the owner, the approval request, including the identifier and the ranked recommendation list, wherein the transaction approval application installed on said account management device causes the activation of an owner interface comprising at least:

an indication of the approval request;

the ranked recommendation list of possible providers including an indication of the purchaser's provider reference, wherein the interface is configured to receive an owner selection of an individual provider from the ranked recommendation list;

an input control element for initiating communication between the owner and the purchaser; and an input control element for transaction approval or denial, wherein the approval is associated with the owner's provider selection in the interface;

transmitting, by the account management device, to the issuer server, whereat purchase parameters are determined, owner approval for the owner's selected provider from the ranked recommendation list of possible providers;

in response to an authorization of the approval request by the issuer server, automatically initiating, using the identifier, the purchase of the good or service at the point of sale device of the approved provider, wherein the authorization is based on purchase parameters for the approved provider.

7. The method of claim 6, wherein on approving a provider recommendation, the owner allocates funds to be used by the payment device for the approved provider recommendation.

8. The method of claim 6, wherein the owner issues to the purchaser an invitation to negotiate before the owner selects a provider recommendation, from a set of provider recommendations, from which the purchase parameters are determined.

9. The method of claim 6, wherein the identifier for the good or service is provided by a purchaser using the payment device.

10. The method of claim 6, wherein the weighted attributes include at least one of price and location.

11. The method of claim 6, further comprising:

receiving, by the account management device, from the remote analytics server, along with the ranked recommendation list, an image and a description of the product or service and purchaser comments.

* * * * *